E. E. WOLF & C. J. SPILMAN.
COMPOUND REEL.
APPLICATION FILED JUNE 30, 1910.

989,097.

Patented Apr. 11, 1911.

2 SHEETS—SHEET 1.

Witnesses:
Elmer R. Shipley.
M. S. Belden.

Elmer E. Wolf,
Clinton J. Spilman,
Inventors;
by James W. See.
Attorney

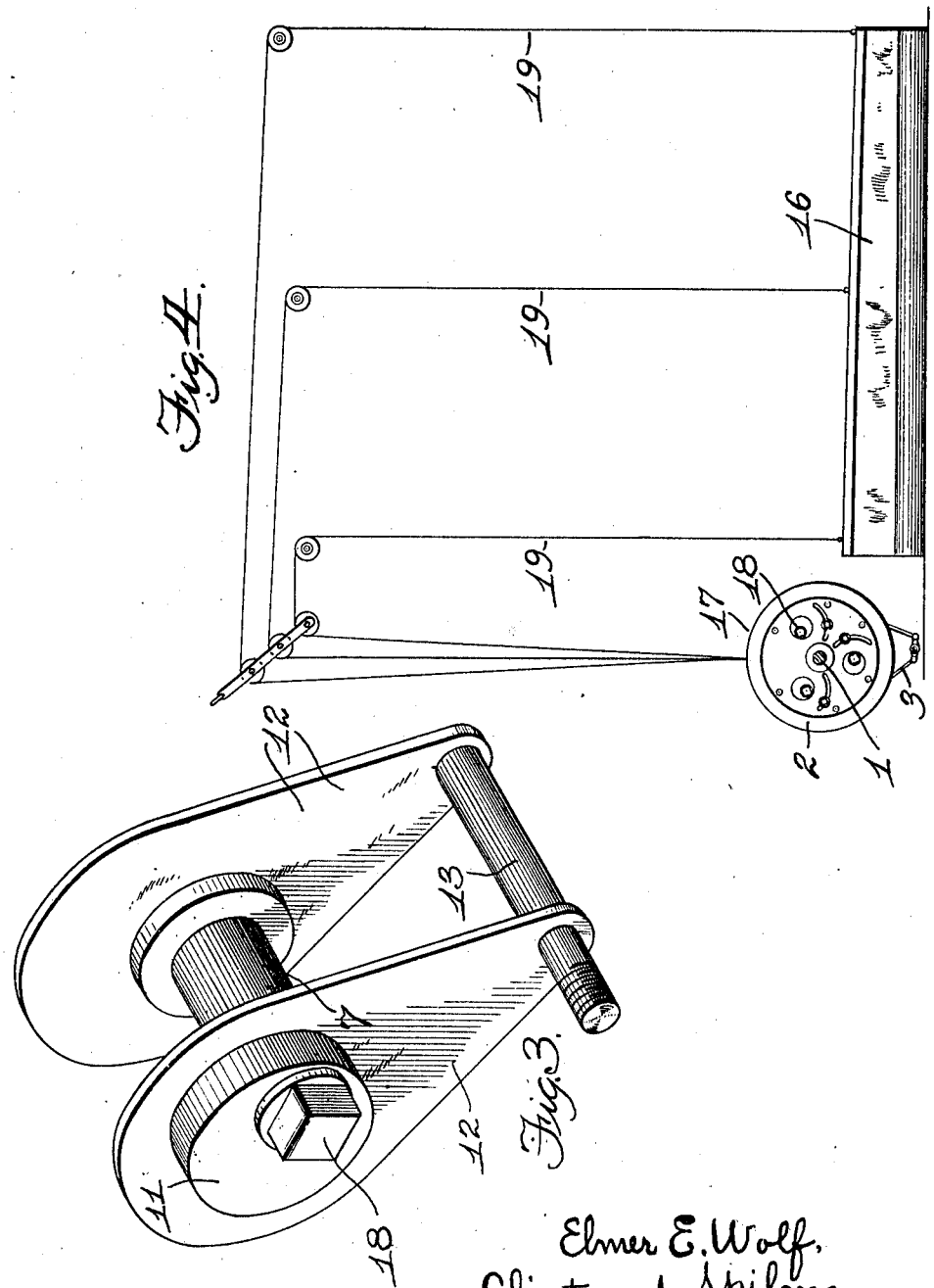

UNITED STATES PATENT OFFICE.

ELMER E. WOLF, OF SPRINGFIELD, AND CLINTON J. SPILMAN, OF SIDNEY, OHIO, ASSIGNORS TO THE ELECTRIC SCENERY HOIST COMPANY, OF SIDNEY, OHIO.

COMPOUND REEL.

989,097.  Specification of Letters Patent.  Patented Apr. 11, 1911.

Application filed June 30, 1910. Serial No. 569,637.

*To all whom it may concern:*

Be it known that we, ELMER E. WOLF and CLINTON J. SPILMAN, citizens of the United States, residing at Springfield, Clark county, Ohio, and Sidney, Shelby county, Ohio, respectively, have invented certain new and useful Improvements in Compound Reels, of which the following is a specification.

This invention pertains to improvements in compound reels designed to wind up simultaneously two or more ropes and to permit also of the independent winding of the several ropes. An exemplifying situation for the employment of such a reel, is a theater where the scene is to be hoisted by several ropes till fully suspended; then trimmed, and then hoisted and lowered as desired. In devices of this general class, each scene is provided with its individual compound reel, and a number of such reels are strung upon a single shaft driven by a suitable motor.

Our present invention will be readily understood from the following description taken in connection with the accompanying drawings in which:—

Figure 2:
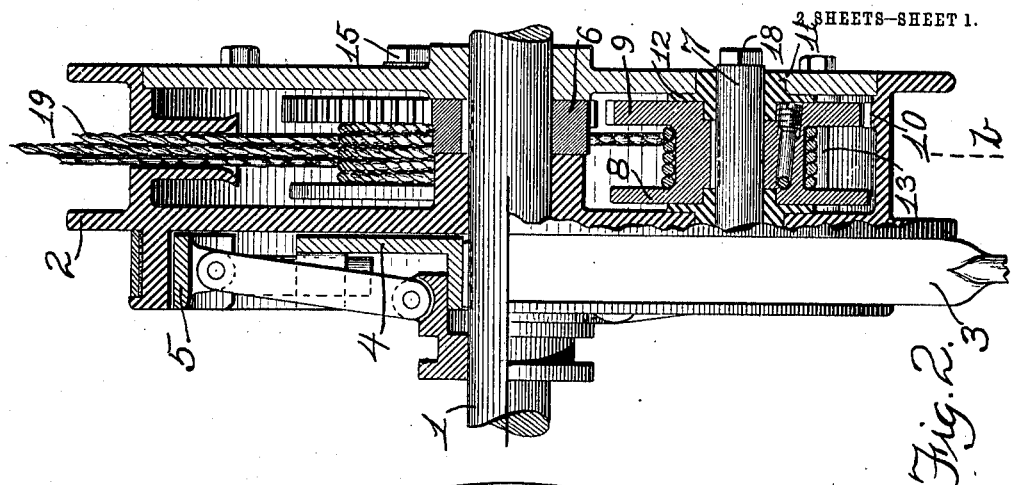
Figure 1:
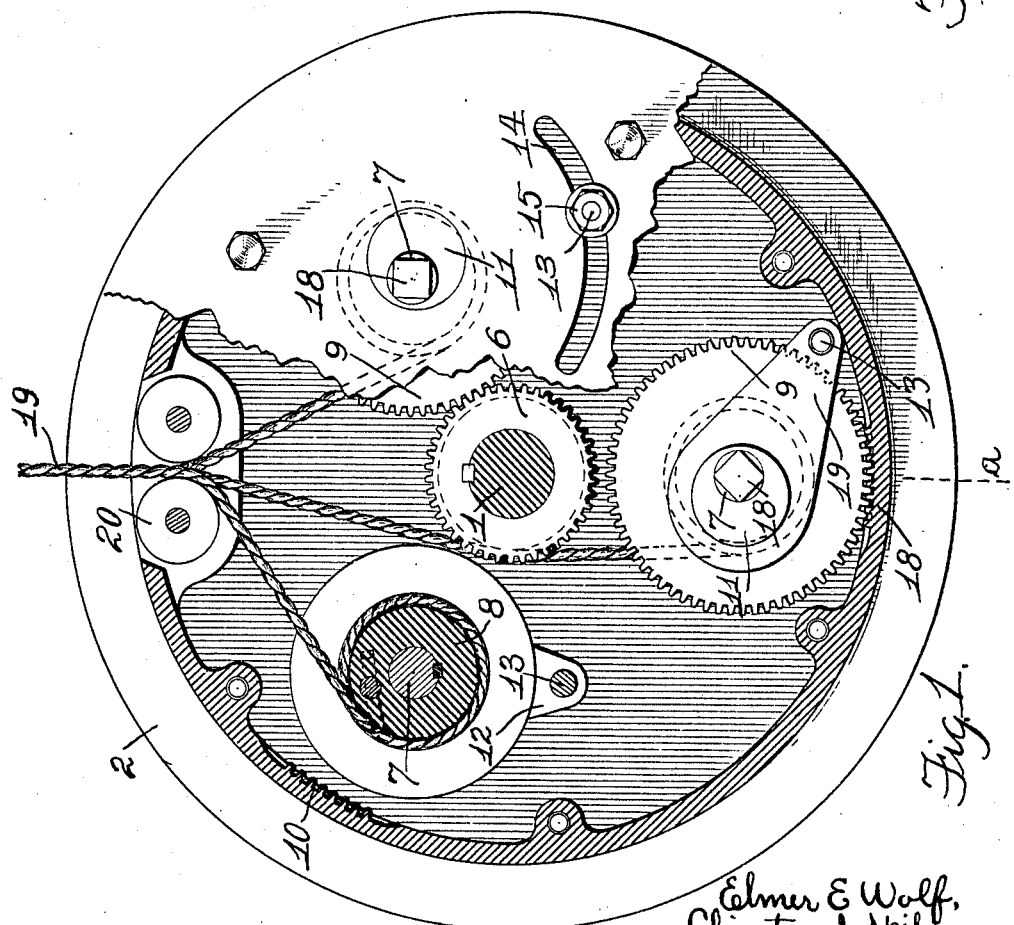

Figure 1 is a side elevation of our improved reel, parts appearing in vertical section in the plane of line *b* of Fig. 2; Fig. 2 a vertical diametrical section of the reel, in the plane of line *a* of Fig. 1, parts appearing in elevation, Fig. 3 a perspective view of one of the planetary reel-mountings: and Fig. 4 a somewhat diagrammatic view of the reel connected with a scene typifying one of the uses of the reel.

In the drawings:—1, indicates a driving-shaft, to be properly supported and rotated when desired by any suitable motor: 2, the main reel loose thereon and adapted to have wound upon it the several ropes to be dealt with, the illustrated example providing for three ropes, this main reel being hollow: 3, a brake, of ordinary construction, coöperating with the main reel: 4, the fixed member of a friction clutch, fast on the shaft: 5, the pads of the friction-clutch, to engage a friction-rim connected with the main reel, the particular form of friction-clutch illustrated being merely typical of any suitable friction-clutch adapted for frictionally securing the main reel to the shaft: 6, a gear disposed within the main reel and fast on the shaft: 7, studs disposed parallel with the shaft and supported by the walls of the main reel, these studs being arranged in circular series, and in number equal to the number of ropes to be dealt with, three in the illustration: 8, a planetary reel secured to each of the studs, each of these reels being adapted to have wound upon it one of the ropes to be dealt with: 9, a gear fast on each planetary reel and adapted, when properly shifted inward, to engage gear 6: 10, lock-teeth, carried by the main reel and adapted to engage gears 9 when the gears are properly shifted outward: 11, a pair of eccentric bearings on each of the studs, one at each side of the planetary reel carried by that stud, these eccentrics being journaled in suitable bearings in the walls of the main reel, and themselves forming bearings for the studs of the planetary reels: 12, an arm projecting outwardly from each eccentric, these arms being disposed between the side walls of the main reel and the ends of the planetary reels: 13, a rod rigidly connecting the two arms of each pair, the ends of these rods projecting out through that wall of the main reel which is opposite to the clutch and brake arrangement: 14, a segmental slot in the wall of the main reel where each of the rods passes out from the reel, the slot being of such length as to permit the proper swinging of the arms in giving to the eccentrics the desired degree of angular adjustment: 15, a nut on the outer end of each rod whereby after a given pair of arms has been adjusted to put the eccentric in proper position, it may be clamped for that position: 16, a typical scene illustrated as rolled up and lying on the stage ready to be dealt with by the reel: 17, the compound reel, considered as a whole: 18, squares on the outer ends of studs 7, to receive a wrench or crank: 19, the three ropes, one attached at each end of the top batten of the scene, and one at the center of length of the batten, the three ropes passing up and over suitable sheaves and then going together through an opening in the periphery of the main reel and into the interior of the main reel where each of the ropes is secured to one of the planetary reels; and 20, a pair of anti-friction rolls carried by the main reel and between which the three ropes pass as they enter the reel.

Assume affairs in condition as illustrated in Fig. 4, the three ropes having been attached to the top batten of the scene which has been laid upon the stage in rolled condition. It is desired to unroll the scene and put it in condition of complete suspension and then trim it and then further hoist it as desired and lower it as desired. The entire apparatus will be stationary.

Nuts 15 are to be loosened and rods 13 are to be so shifted in their slots that all the gears 9 will be brought into proper engagement with gear 6, after which the nuts are to be tightened. Upon giving motion to shaft 1, as by starting its motor, the planetary reels may then be turned upon their individual axes by the action of gear 6 winding up upon them the individual ropes until the scene is completely suspended. Shaft 1 having been stopped, the rods pertaining to the two planetary reels connected with the ropes for the ends of the batten are now to be readjusted so as to free those two reels, leaving the same suspended by the center rope which is held by the stationary shaft, the two rods being then locked or held while, by means of a wrench or crank on the squared ends of the studs, these two reels are turned, forward or backward, as needed, to bring the scene into trim. All the rods, one at a time, are then to be so adjusted as to move the planetary reels outward and lock them to teeth 10 so that they are no longer at liberty to turn on their individual axes. The shaft 1 and the main reel now being started into motion, causes the three ropes to wind up equally on the main reel, thus permitting the trimmed scene to be hoisted into the flies or to be lowered to position for use, as desired.

While the reel has been illustrated as one designed to deal with three ropes, it is manifest that the system will lend itself to the use of any desired number of ropes, and it is to be understood that the particular construction illustrated constitutes but a single exemplification of our invention, forming the best mode in which we at present contemplate embodying the invention.

We claim:—

1. A compound reel comprising, a hollow main reel having an opening in its periphery to permit a plurality of ropes to pass into the reel, a plurality of planetary reels mounted in the main reel and adapted for rotation on their individual axes, and a locking device to prevent the turning of the planetary reels on their individual axes, combined substantially as set forth.

2. A compound reel comprising, a hollow main reel having an opening in its periphery to permit a plurality of ropes to pass into the reel, a plurality of planetary reels mounted in the main reel and adapted for rotation on their individual axes, driving mechanism for rotating the planetary reels in unison while the main reel is at rest, and a locking device to prevent the turning of the planetary reels on their individual axes, combined substantially as set forth.

3. A compound reel comprising, a hollow main reel having an opening in its periphery to permit a plurality of ropes to pass into the reel, a plurality of planetary reels mounted in the main reel and adapted for rotation on their individual axes, and a locking device to prevent the turning of any selected one of the planetary reels on its individual axis, combined substantially as set forth.

4. A compound reel comprising, a hollow main reel having an opening in its periphery, driving and braking mechanism for the main reel, a plurality of planetary reels mounted within the main reel, gearing connecting the planetary reels with the driving mechanism so that the planetary reels may be turned on their axes while the main reel is at rest, means for disconnecting the planetary reels from the driving mechanism, and locking devices to lock the planetary reels against rotation on their axes, combined substantially as set forth.

5. A compound reel comprising, a hollow main reel having an opening in its periphery to permit a plurality of ropes to pass into the reel, a plurality of planetary reels mounted in the main reel and adapted for rotation on their individual axes, an eccentric mounting at the axis of each of the planetary gears whereby such axis may be shifted to and from the center of the main reel, a shaft on which the main reel is loosely mounted, a gear fast on said shaft within the main reel, a gear on each of the planetary reels and adapted to be engaged with said previously mentioned gear by the adjustment of said eccentric mountings, and a locking device to prevent the turning of the planetary reels on their axes, combined substantially as set forth.

6. A compound reel comprising, a hollow main reel having an opening in its periphery to permit a plurality of ropes to pass into the reel, a plurality of planetary reels mounted in the main reel and adapted for rotation on their individual axes, an eccentric mounting at the axis of each of the planetary gears whereby such axis may be shifted to and from the center of the main reel, a shaft on which the main reel is loosely mounted, a gear fast on said shaft within the main reel, a gear on each of the planetary reels and adapted to be engaged with said previously mentioned gear by the adjustment of said eccentric mountings, and locking-teeth carried by the inwall of the reel and adapted to be engaged by the teeth of the gears on the planetary reels when they are adjusted outwardly by means of the eccentric mountings, combined substantially as set forth.

7. A compound reel comprising, a hollow main reel having an opening in its periphery to permit a plurality of ropes to pass into the reel, a pair of rolls carried by the reel at said opening and adapted to straddle the ropes passing therethrough, a plurality of planetary reels mounted in the main reel and adapted for rotation on their individual axes, and a locking device to prevent the turning of the planetary reels on their individual axes, combined substantially as set forth.

8. A compound reel comprising, a shaft, a hollow main reel loosely mounted thereon and having an opening in its periphery for the passage of a plurality of ropes into the reel, driving and braking mechanism for the main reel, a gear fast on the shaft within the main reel, a plurality of pairs of eccentrics mounted in bearings in the sidewalls of the main reel, a stud mounted for rotation in each pair of eccentrics and having an end projecting outside the main reel to permit of the stud being turned, a planetary reel secured to each stud, a gear on each planetary reel and adapted to be adjusted into engagement with the first-mentioned gear, and a locking device carried by the main reel and adapted to engage teeth of the gears on the planetary reels when those reels are adjusted outwardly, an arm connected with each pair of eccentrics to serve in angularly adjusting the eccentrics, an adjusting device connected with each arm and projecting out through said segmental slot in the wall of the main reel, and means for locking the adjusting device in any portion of said slot, combined substantially as set forth.

ELMER E. WOLF.
CLINTON J. SPILMAN.

Witnesses as to Wolf:
   W. E. ARTHUR,
   FRED A. WAGNER.
Witnesses as to Spilman:
   M. S. BELDEN,
   LUTIE HALE.

---

Copies of this patent may be obtained for five cents each, by addressing the "Commissioner of Patents, Washington, D. C."